3,076,764
ISOTACTIC POLYMERS OF 4-METHYL-1-PENTENE
AS GREASE THICKENERS
Erling Hansen, Oakland, and Bruce W. Hotten, Orinda, Calif., assignors to California Research Corporation, San Francisco, Calif., a corporation of Delaware
No Drawing. Filed Sept. 30, 1960, Ser. No. 59,520
7 Claims. (Cl. 252—59)

This invention pertains to grease compositions wherein the thickening agent is a polymer of 4-methyl-1-pentene. That is, the invention described herein is directed to grease compositions thickened with poly(4-methyl-1-pentene).

The art is well sprinkled with suggestions concerning the use of highly polymerized hydrocarbons as addition agents to lubricating oil composition. For example, polymers of ethylene and propylene have been described as thickening agents for lubricating oils to form grease compositions. However, certain disadvantages arise from the use of these particular polymers as grease thickening agents.

Although polymers of ethylene and propylene are extremely effective as thickening agents for grease compositions which have high stability against oxidation, such polymeric thickened greases do not have sufficiently high dropping points for extremely high temperature services. Polymers of ethylene and propylene result in the formation of grease compositions having melting points which are too low for the present-day high temperature service requirements. Crease compositions prepared from polyethylene thickening agents usually have melting points in the range of approximately 200° F. Grease compositions thickened with polymers of propylene usually have ASTM melting points of about 300° F. Such low melting point grease compositions soon disappear from the wearing surfaces where temperatures are in the range of about 400° F. to 500° F. and higher, leaving such surfaces without adequate lubrication.

Certain other polymeric substances are also described as thickening agents for lubricating oils to improve the viscosity indexes thereof. Polymers of n-butenes, n-pentenes, etc., which are oil-soluble; that is, they are readily soluble in lubricating oils, thicken lubricating oils and improve the viscosity indexes thereof. For example, the 1-olefins described in U.S. Patent No. 2,525,788 are polymeric substances which are useful as viscosity improving agents for lubricating oil compositions. However, the described polymeric substances are too oil-soluble to be used as thickening agents to form grease compositions.

It is a desirable feature of thickened lubricating oils that the thickening agent be effective over a wide range of temperatures; that is, that the thickened lubricating oils do not lose their structure and become fluid. Lubricating oils thickened with polybutenes and other high olefinic polymers gradually lose their physical structure on heating, exhibiting no definite melting point, and become too fluid for the intended purposes. Furthermore, lubricating oils thus thickened are rubbery and stringy.

Grease compositions thickened with polyolefins have several advantages over the normal soap-thickened grease compositions. Whereas the latter grease compositions are more or less readily oxidized under storage and high temperature service conditions, grease compositions thickened with polymers of olefins are resistant to oxidative attack. Subsequent to their manufacture, grease compositions are stored for relatively long periods of time prior to their use as a lubricant. During these periods of storage, ordinary soap thickened grease compositions tend to oxidize, yielding oxidation products which are acidic in nature. Also, during the lubrication of wearing surfaces, grease compositions oxidize to form products which are acidic in nature. These acidic products which are thus formed are detrimental to the metal surfaces to which the grease itself is finally applied.

Furthermore whereas soap-thickened grease compositions are sensitive to acids bases or surface-active additives in grease compositions the particular polyolefins described herein are resistant to such chemical attack. In other words corrosive chemicals which would normally damage or destroy soap gels do not affect the grease structure of the grease compositions thickened with the particular isotactic polymers described herein.

It is a tremendous advantage in lubricating systems which are not readily accessible to use grease compositions which withstand high temperatures and the effects of oxidation for long periods of time. Greases which are used to lubricate such parts as found in sealed bearings of electric motors sealed bearings of compressors, numerous pieces of high-speed equipment such as high-speed motors, must be resistant to oxidation and have high temperature stability.

It is a primary object of this invention to describe grease compositions having incorporated therein certain polymeric compounds which are particularly effective in the formation of high-temperature grease compositions which are resistant to oxidation and the corrosive action of chemicals.

In accordance with this invention, it has been discovered that oxidation resistant grease compositions having high melting points are obtained by thickening lubricating oils with certain isotactic poly(4-methyl-1-pentenes).

Not only are the grease compositions described herein more resistant to the effects of oxidation and chemicals than soap-thickened grease compositions, but such greases are also resistant to bleeding and to emulsification in water.

The isotactic polymers of 4-methyl-1-pentenes used herein as grease thickening agents have molecular weights in the range of 100,000 to 10,000,000. Such poly(4-methyl-1-pentenes) are used in lubricating oils in amounts sufficient to thicken such lubricating oils to the consistency of greases; that is, amounts from 2% to 30% by weight, preferably 10% to 15% by weight.

Lubricating oils which can be used as base oils include a wide variety of lubricating oils, such as naphthenic base, paraffin base, and mixed base lubricating oils, other hydrocarbon lubricants, e.g., lubricating oils derived from coal products, and the synthetic oils, e.g., alkylene polymers (such as polymers of propylene, butylene, etc., and the mixtures thereof), alkylene oxide-type polymers (e.g., propylene oxide polymers) and derivatives thereof, including alkylene oxide polymers prepared by polymerizing the alkylene oxides in the presence of water or alcohols, e.g., ethyl alcohol, dicarboxylic acid esters (such as those which are prepared by esterifying such dicarboxylic acids as adipic acid, azelaic acid, suberic acid, sebacic acid, alkanol succinic acid, etc., with alcohols such as butyl alcohol, hexyl alcohol, 2-ethyl hexyl alcohol, etc.), liquid esters of acids of phosphorus, alkyl benzenes (e.g., monoalkyl benzenes such as dodecyl benzene, tetradecyl benzene, etc.), polyphenyls (e.g. biphenyls and terphenyls), alkyl biphenyl ethers, etc. Synthetic oils of the alkylene oxide type polymers which may be used include those exemplified by the alkylene oxide polymers.

The above base oils may be used individually or in combinations thereof, wherever miscible or wherever made so by the use of mutual solvents.

The grease compositions of this invention are prepared by methods similar to the conventional methods of grease making. That is, lubricating greases can be prepared by heating the poly(4-methyl-1-pentene) and the desired base oils, then cooling and milling the mixture.

Example 1 hereinbelow illustrates the preparation of an isotactic poly(4-methyl-1-pentene) which was used as a grease thickening agent according to this invention.

EXAMPLE 1.—PREPARATION OF ISOTACTIC POLY(4-METHYL 1-PENTENE)

A mixture of 175 g. of 4-methyl-1-pentene, 96% pure, 100 g. of n-heptane, 0.75 g. of $TiCl_3$ and 2.75 g. of $Al(C_2H_5)_3$ was heated in a bomb at 60–70° C. for 30 hours, forming a polymer having a melting point of 198–201° C. and a reduced viscosity of 1.7 measured at 135° C. in a concentration of 0.5 g./100 ml. in tetralin.

The reduced viscosity was obtained from the equation:

$$\text{Red. vis.} = \left[ \frac{\eta_{soln.}/\eta_{solv.} - 1}{\text{Concentration}} \right]$$

Table I hereinbelow illustrates the effectiveness of the polymers described herein as grease thickening agents.

Base Oil A was a California solvent refined base oil having a viscosity of 480 SSU at 100° F.

Base Oil B was a California lubricating oil having a viscosity of 600 SSU at 100° F.

Base Oil C was pentaerythritol tetracaproate.

The grease compositions described in Table I were prepared by heating the components to the noted temperature, followed by homogenizing through a needle valve at the pressure noted.

The "bearing life" for a particular grease composition was determined by the following test procedure, which is known as the Navy high speed bearing test. In this test, a ball bearing packed full of grease was operated at 10,000 r.p.m. continuously for approximately 22 hours at 300° F. The apparatus was then cooled to room temperature during a period of two hours. This procedure of operation at 10,000 r.p.m. at 300° F. and cooling was repeated until there was bearing failure. Thus, the number of hours in Table I are the hours of testing prior to the failure of the bearing in this test.

The poly(4-methyl-1-pentenes) can be used in lubricating oils in amounts such as to form filter coatings, rust preventatives, encapsulating compositions, and greases useful in high temprature services.

Because metal soap thickened greases are pro-oxidative; that is, increase the susceptibility of grease compositions to oxidation, it is necessary to incorporate large amounts of oxidation inhibitors in these greases. Thus, by use of the grease thickening agents of this invention it is possible to obtain high temperature grease compositions resistant to oxidation without necessarily using oxidation inhibitors.

We claim:

1. A grease composition consisting essentially of a major proportion of an oil of lubricating viscosity, and, in amount sufficient to thicken said oil to the consistency of a grease, an isotactic poly(4-methyl-1-pentene) having a molecular weight in the range of 100,000 to 10,000,000.

2. A grease composition consisting essentially of a major proportion of an oil of lubricating viscosity, and from 2% to 30%, by weight, of an isotactic poly(4-methyl-1-pentene) having a molecular weight in the range of 100,000 to 10,000,000.

3. A grease composition consisting essentially of a major proportion of an oil of lubricating viscosity, and from 10% to 15%, by weight, of an isotactic poly(4-methyl-1-pentene) having a molecular weight in the range of 100,000 to 10,000,000.

4. A grease composition consisting essentially of a major proportion of a petroleum base lubricating oil, and from 2% to 30%, by weight, of an isotactic poly(4-methyl-1-pentene) having a molecular weight of 100,000 to 10,000,000.

5. A grease composition, consisting essentially of a major proportion of a petroleum base lubricating oil, and from 10% to 15%, by weight, of an isotactic poly(4-methyl-1-pentene) having a molecular weight of 100,000 to 10,000,000.

6. A grease composition consisting essentially of a petroleum hydrocarbon lubricating oil, and from 10% to 15%, by weight, of an isotactic poly(4-methyl-1-pentene) having a molecular weight of 100,000.

7. A grease composition consisting essentially of a petroleum hydrocarbon lubricating oil, and from 10% to 15%, by weight, of an isotactic poly(4-methyl-1-pentene) having a molecular weight of 1,000,000.

Table I

| | 1 | 2 | 3 | 4 | 5 | 6 |
|---|---|---|---|---|---|---|
| Grease Compositions, wt. %: | | | | | | |
| Isotactic poly(4-methyl-1-pentene)— | | | | | | |
| (a) Mol. wt. of 100,000 | 10 | 12 | | | | |
| (b) Mol. wt. of 1,000,000 | | | 13 | 10 | 10 | 15 |
| Base Oil A | 90 | | | | | |
| Base Oil B | | 83 | 87 | 90 | 85 | |
| Base Oil C | | | | | | 85 |
| Other Additives | | 1⁵ | | | 1⁵ | |
| Grease Preparation: | | | | | | |
| Temperature, ° F | 400 | 430 | 430 | 430 | 430 | 475 |
| Milling Pressure, p.s.i. | 4,000 | 4,000 | (²) | (²) | (²) | (²) |
| Grease Characteristics: | | | | | | |
| ASTM Penetration (P₆₀) | 317 | 267 | 233 | 309 | | 326 |
| ASTM Dropping Point (° F.) | 419 | 427 | 430 | 420 | 420 | 470 |
| Bearing Life (Hrs.) | | | | 578, 395 | 1,255, 712 | |

¹ An oxidation inhibiter.
² 4,000 to 5,000 p.s.i.

References Cited in the file of this patent

UNITED STATES PATENTS

| | | |
|---|---|---|
| 2,525,788 | Fontana et al. | Oct. 17, 1950 |
| 2,734,031 | McNaughtan | Feb. 7, 1956 |
| 2,901,432 | Morway et al. | Aug. 25, 1959 |